United States Patent
Schlarb et al.

(10) Patent No.: US 6,794,436 B2
(45) Date of Patent: Sep. 21, 2004

(54) SOLVENT-FREE PIGMENTED FORMULATION

(75) Inventors: Bernhard Schlarb, Ludwigshafen (DE); Rolf Dersch, Neustadt (DE); David Christie, Singapore (SG); Franz Weingart, Weinheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 9 days.

(21) Appl. No.: 10/138,410

(22) Filed: May 6, 2002

(65) Prior Publication Data

US 2003/0078338 A1 Apr. 24, 2003

(30) Foreign Application Priority Data

May 31, 2001 (DE) .......................................... 101 26 717

(51) Int. Cl.$^7$ .............................. C08K 3/10; C08K 3/30
(52) U.S. Cl. ....................... 524/423; 524/424; 524/425; 524/427; 524/442; 524/444; 524/446; 524/556; 524/492; 524/493
(58) Field of Search ................................. 524/423, 425, 524/427, 492, 493, 424, 442, 444, 446, 556

(56) References Cited

U.S. PATENT DOCUMENTS

| | | | |
|---|---|---|---|
| 2,760,886 A | * 8/1956 | Prentiss et al. | 428/461 |
| 3,365,410 A | * 1/1968 | Wesslau et al. | 524/521 |
| 4,243,430 A | 1/1981 | Sperry et al. | |
| 4,521,494 A | 6/1985 | Mani | |
| 5,354,800 A | 11/1994 | Suzuki et al. | |
| 5,708,077 A | 1/1998 | Nolken et al. | |
| 5,905,114 A | * 5/1999 | Baumstark et al. | 524/801 |
| 2001/0000232 A1 | 4/2001 | Zhao et al. | |

FOREIGN PATENT DOCUMENTS

| | | |
|---|---|---|
| CA | 2189889 A1 | 5/1997 |
| DE | 4236316 A | 5/1993 |
| DE | 198 11 314 A | 9/1999 |
| EP | 0 327 006 B1 | 8/1989 |
| EP | 0 327 376 B2 | 8/1989 |
| EP | 0 612 771 B1 | 8/1994 |
| EP | 0773245 A | 5/1997 |
| EP | 0 810 274 B1 | 12/1997 |
| EP | 0 915 071 A2 | 5/1999 |
| JP | 3081379 A | 4/1991 |
| WO | WO 98/33831 | 8/1989 |
| WO | WO 93/11181 | 6/1993 |
| WO | WO 94/21699 | 9/1994 |
| WO | WO 99/47611 | 9/1999 |

OTHER PUBLICATIONS

"Plastics, Properties and Testing to polyvinyl Compounds", Ullmann's Encyclopedia of Industrial Chemistry, 5$^{th}$ Edition, vol. A 21, pp. 169—171.
Helmut Rinno, Farbe +Lack, 99, Jul. 1993, pp. 697—704.
Ullmann's Encyklopaedie der Technischen Chemie, 4th. Edition., vol. 15, pp. 667—668.
H. Warson, "Synthetic Resin Emulsions", Ernest Benn Limited, London, 1972, pp. 776—779.

* cited by examiner

Primary Examiner—Judy M. Reddick
(74) Attorney, Agent, or Firm—Oblon, Spivak, McClelland, Maier & Neustadt, P.C.

(57) ABSTRACT

The present invention relates to a solvent-free pigmented formulation comprising I) a binder based on at least one copolymer P in an aqueous polymer dispersion obtainable by free-radical aqueous emulsion polymerization of a monomer mixture containing
  a) from 45 to 69.95% by weight of at least one monomer a) whose homopolymer has a glass transition temperature $T_g$ of less than 20° C.,
  b) from 30 to 54.95% by weight of at least one monomer b) whose homopolymer has a glass transition temperature $T_g$ of more than 50° C.,
  c) from 0.05 to 1.5% by weight of itaconic acid and/or its anhydride and/or its salts, as acidic monomer c), and
  d) from 0 to 2% by weight of at least one further monomer d), the sum of the % by weight of a) to d) being 100% by weight, II) at least one pigment,
III) at least one pigment dispersant having an acid number to DIN 53402 of less than 600,
IV) if desired, an inorganic filler, and
V) customary auxiliaries.

13 Claims, No Drawings

SOLVENT-FREE PIGMENTED FORMULATION

FIELD OF THE INVENTION

The present invention relates to a solvent-free pigmented formulation comprising I) a binder based on at least one copolymer P in an aqueous polymer dispersion obtainable by free-radical aqueous emulsion polymerization of a monomer mixture containing
   a) from 45 to 69.95% by weight of at least one monomer a) whose homopolymer has a glass transition temperature $T_g$ of less than 20° C.,
   b) from 30 to 54.95% by weight of at least one monomer b) whose homopolymer has a glass transition temperature $T_g$ of more than 50° C.,
   c) from 0.05 to 1.5% by weight of itaconic acid and/or its anhydride and/or its salts, as acidic monomer c), and
   d) from 0 to 2% by weight of at least one further monomer d),
the sum of the % by weight of a) to d) being 100% by weight, II) at least one pigment, III) at least one pigment dispersant having an acid number to DIN 53402 of less than 600, IV) if desired, an inorganic filler, and V) customary auxiliaries.

The present invention further relates to a process for preparing the solvent-free pigmented formulation of the invention, and to its use as an emulsion paint.

BACKGROUND OF THE INVENTION

To reduce the burden on the environment, and from a workplace safety standpoint, it is desirable for coated compositions, especially those used in enclosed areas, such as emulsion paints, polymer dispersion plasters or tile adhesives, not to give off volatile, nonaqueous organic or inorganic components to their surroundings. In principle, this may be achieved in part by using aqueous polymer dispersions as binders for these coating systems.

However, conventional binders based on aqueous polymer dispersions generally still include small amounts of organic solvents. These are necessary in order to reduce the mean film formation temperature of the binders and so to ensure that the coating compositions can be processed even at low temperatures. The mean film formation temperature of the polymer binders may also be reduced by "internal plasticization", i.e., by lowering the glass transition temperature of the binder polymer (see Ullmann's Encyclopaedia of Industrial Chemistry, 5th Ed. Vol. A21, p. 169). If the film formation temperature of the polymeric binder is too low, however, there is a risk that the coating compositions will have a poor pigment binding capacity and will lack adequate mechanical strength, and, moreover, will soil easily (see H. Rinno, farbe+lack, 99 (1993) 697 ff).

For reasons of cost it is advantageous for the binder to have the capacity to bind large amounts of fillers. Interior emulsion paints, for example, have pigment volume concentrations PVC (PVC=pigment volume/(pigment volume+ binder volume); cf. Ullmanns Enzyklopädie der Technischen Chemie, 4th Ed. Vol. 15, p. 667) in the range from 50 to 85%. If the PVC tolerated for the binder is exceeded, the paint film no longer has adequate wet abrasion resistance.

According to H. Warson ('synthetic Resin Emulsions', E. Benn Ltd., London, 1972, p. 776 ff.), polymers have a high pigment binding power if they include from 1 to 4% by weight of carboxyl-containing monomers. In the case of high-grade binders, indeed, the amount of these monomers is between 2.5 and 7% by weight. On the other hand, if the acid content is too high, there is a risk of the polymer becoming too soluble in water, with a resulting decrease in the wet abrasion resistance of the coating compositions.

The literature includes a range of examples of polymer dispersions suited for use as solvent-free binders for low-emission coating compositions. For example, EP-B-327 006 and EP-B-327 376 describe polymer dispersions based on vinyl esters where the copolymerized monomers include, in small amounts, silanes. EP-A-612 771 describes similar binder polymers, based on acrylic esters, containing in copolymerized form from 1 to 4% by weight of monomers containing carboxyl groups, and at least one silane monomer. Even minimal inclusion of vinyl silane monomers, however, represents a considerable increase in the costs of producing the binders. Moreover, the change in the properties of the binder on storage, owing to the hydrolysis of the silane groups, must be considered.

EP-A 810 274 discloses binders for solvent-free interior paints which may contain in copolymerized form up to 1% by weight of monomers containing acid groups, based on the overall weight of the monomers to be polymerized.

WO-A 94/21699 describes binders for solvent-free interior paints which may contain up to 5% by weight of copolymerized monomers containing acid groups, and which are prepared from a prepolymer having a very specific particle size.

WO-A 99/47611 relate to pigmented aqueous formulations whose binder includes a copolymer containing from 0.1 to 1.5% by weight of itaconic acid. In the examples of WO-A 99/47611, a salt of polyacrylic acid is used as a pigment dispersant.

EP-A 915 071 discloses copolymers containing from 0.2 to 5% by weight of itaconic acid. These copolymers are used to coat mineral moldings.

Moreover, WO-A 93/11181 and WO-A 98/33831 disclose itaconic acid copolymers suitable for preparing pigment pastes and, respectively, as binders for solvent-free interior paints.

The binders described in these publications are able only partly to meet the demands which they encounter in the context of their use for solvent-free pigmented formulations. For certain applications of solvent-free paint formulations it is necessary in particular to provide a binder providing an abrasion-resistant and scrubfast paint even when said paint formulations have a pigment volume concentration (PVC) of more than 75%.

SUMMARY OF THE INVENTION

It is an object of the present invention to remedy the disadvantages depicted and to develop a solvent-free pigmented formulation which, even at a high pigment volume concentration (PVC) of more than 75%, exhibits very good resistance to wet abrasion and wet scrubbing. The binder present within the solvent-free pigmented formulation ought to be characterized by a minimum film formation temperature of less than 10° C.

The invention accordingly provides a solvent-free pigmented formulation comprising I) a binder based on at least one copolymer P in an aqueous polymer dispersion obtainable by free-radical aqueous emulsion polymerization of a monomer mixture containing a) from 45 to 69.95% by weight of at least one monomer a) whose homopolymer has a glass transition temperature $T_g$ of less than 20° C., b) from 30 to 54.95% by weight of at least one monomer b) whose homopolymer has a glass transition temperature $T_g$ of more than 50° C., c) from 0.05 to 1.5% by weight of itaconic acid and/or its anhydride and/or its salts, as acidic monomer c), and d) from 0 to 2% by weight of at least one further monomer d), the sum of the % by weight of a) to d) being 100% by weight, II) at least one pigment, III) at least one pigment dispersant having an acid number to DIN 53402 of less than 600, IV) if desired, an inorganic filler, and V) customary auxiliaries.

DESCRIPTION OF THE PREFERRED EMBODIMENTS

The binder present in the pigmented formulation of the invention is constructed inter alia from the monomers a) and b), which feature different glass transition temperatures $T_g$.

$T_g$ is the limit value of the glass transition temperature toward which said temperature moves, according to G. Kanig (Kolloid-Zeitschrift & Zeitschrift für Polymere, Vol. 190, p. 1, Equation 1), with increasing molecular weight; it is determined by the DSC method (Differential Scanning Calorimetry, 20 K/min, midpoint). The $T_g$ values for the homopolymers of most monomers are known and are listed, for example in Ullmann's Encyclopedia of Industrial Chemistry, VCH Weinheim, 1992, 5th Ed., Vol. A21, p. 169; further sources of glass transition temperatures of homopolymers include, for example, J. Brandrup, E. H. Immergut, Polymer Handbook, 1st Ed., J. Wiley, New York 1966, 2nd Ed. J. Wiley, New York 1975, and 3rd Ed. J. Wiley, New York 1989).

$C_1$–$C_n$ alkyl groups below are linear or branched alkyl radicals having from 1 to n carbon atoms, examples being methyl, ethyl, propyl, n-butyl, sec-butyl, isobutyl, t-butyl, pentyl, n-hexyl, 2-ethylhexyl, n-decyl, dodecyl, lauryl, and stearyl. $C_5$–$C_{10}$ cycloalkyl groups are preferably cyclopentyl or cyclohexyl groups, unsubstituted or substituted by 1, 2 or 3 $C_1$–$C_4$ alkyl groups.

The polymers present in the binders I are composed of from 45 to 69.95% by weight, preferably from 50 to 64.95% by weight, of monomers a). Suitable monomers a) are preferably vinyl ethers of $C_3$–$C_{10}$ alkanols, branched and unbranched $C_3$–$C_{10}$ olefins, $C_1$–$C_{10}$ alkyl acrylates, $C_5$–$C_{10}$ alkyl methacrylates, $C_5$–$C_{10}$ cycloalkyl (meth)acrylates, $C_1$–$C_{10}$ dialkyl maleates and/or $C_1$–$C_{10}$ dialkyl fumarates. Particular preference is given to using those monomers a) whose homopolymers have glass transition temperatures of below 0° C. Particular preference is given to using as monomers a) ethyl acrylate, n-propyl acrylate, n-butyl acrylate, isobutyl acrylate, sec-butyl acrylate, n-hexyl acrylate, 2-ethylhexyl acrylate, n-hexyl methacrylate, 2-ethylhexyl methacrylate, di-n-butyl maleate and/or di-n-butyl fumarate.

Suitable monomers b) are vinylaromatic monomers and/or α,β unsaturated carbonitriles or carbodinitriles. They are used in amounts of from 30 to 54.95% by weight, and preferably from 35 to 49.95% by weight. By vinylaromatic monomers are meant, in particular, derivatives of styrene or of α-methylstyrene in which the phenyl nuclei are unsubstituted or substituted by 1, 2 or 3 $C_1$–$C_4$ alkyl groups, chloro and/or methoxy groups. Preferred such monomers are those whose homopolymers have a glass transition temperature above 80° C. Particularly preferred monomers are styrene, α-methylstyrene, o- or p-vinyltoluene, acrylonitrile, methacrylonitrile, maleonitrile, fumaronitrile or mixtures thereof.

The binder I further includes from 0.05 to 1.5% by weight, in particular from 0.07 to 0.7% by weight, and with particular preference from 0.1 to 0.5% by weight, of itaconic acid and/or its anhydride or its salts, as acidic monomer c). Salts used include in particular the alkali metal, alkaline earth metal or ammonium salts of itaconic acid. It is also possible to use a mixture of itaconic acid with one or more salts of itaconic acid or else with the anhydride of itaconic acid. As monomer c) it is preferred to use exclusively itaconic acid.

The binder I of the invention may also include monomers d) in amounts of up to 2% by weight, preferably in amounts of from 0.5 to 2% by weight, in particular in amounts of from 0.5 to 1.5% by weight, in copolymerized form. Preferred monomers are the amides and the hydroxyalkyl esters of α,β unsaturated $C_3$–$C_6$ carboxylic acids, with particular preference acrylamide, methacrylamide, 2-hydroxyethyl acrylate, 2-hydroxyethyl methacrylate, 2-hydroxypropyl (meth)acrylate or 1,4-butanediol monoacrylate. A further suitable monomer is N-vinylpyrrolidone.

Besides the abovementioned monomers a), b), c), and d), the binders I may also include further monomers in order to give the respective coating compositions a greater strength. Here, mention may be made for example of monomers containing siloxane groups, such as the vinyltrialkoxysilanes, e.g., vinyltrimethoxysilane, alkylvinyldialkoxysilanes or (meth)acryloyloxyalkyltrialkoxysilanes, e.g., (meth)acryloyloxyethyltrimethoxysilane and (meth)acryloyloxypropyltrimethoxysilane.

In the binders I, moreover, there may also be crosslinking monomers having at least two nonconjugated ethylenically unsaturated double bonds. Examples thereof are monomers containing two vinyl radicals, monomers containing two vinylidene radicals, and monomers containing two alkenyl radicals. Particularly advantageous monomers here are the diesters of dihydric alcohols with α,β-monoethylenically unsaturated monocarboxylic acids, preferably acrylic and methacrylic acid. Examples of such monomers containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate, and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate.

The abovementioned monomers may be used in amounts of from 0.05 to 1 part by weight, preferably from 0.05 to 0.5 part by weight, based on 100 parts by weight of monomers a) plus b) plus c) plus d).

The aqueous polymer dispersions used as binders I are obtained by free-radical aqueous emulsion polymerization of the abovementioned monomers a) to d) in the presence of from 0.1 to 0.5% by weight, preferably from 0.1 to 0.4% by weight, and in particular from 0.1 to 0.3% by weight, based in each case on the amount of the monomers a) to d), have at least one free-radical polymerization initiator.

The polymerization is conducted in the presence of free-radical polymerization initiators. Suitable free-radical polymerization initiators include all those capable of triggering a free-radical aqueous emulsion polymerization. Such compounds may be peroxides, hydroperoxides, e.g., alkali metal peroxodisulfates, or azo compounds. Use is also made of combined systems composed of at least one organic reducing agent and at least one peroxide and/or hydroperoxide, examples being tert-butyl hydroperoxide with the sodium salt of hydroxymethanesulfinic acid, hydrogen peroxide with ascorbic acid, or sodium peroxodisulfate with sodium disulfite. Preferred combined systems further include a small amount of a metal compound which is soluble in the polymerization medium and whose metallic component is able to exist in a plurality of valence states, e.g., ascorbic acid/iron(II) sulfate/hydrogen peroxide, with ascorbic acid frequently being replaced by the sodium salt of hydroxymethanesulfinic acid, sodium sulfite, sodium hydrogen sulfite or sodium bisulfite, and hydrogen peroxide by tert-butyl hydroperoxide or alkali metal peroxodisulfates and/or ammonium peroxodisulfate. Instead of a water-soluble iron(II) salt it is common to use a combination of water-soluble iron salts and vanadium salts. Preferred initiators are the ammonium or alkali metal salts of peroxosulfates or peroxodisulfates, particularly sodium or potassium peroxodisulfate.

In the preparation of the binders I that are present in the pigmented formulations of the invention, the surface-active substances customary for an emulsion polymerization are accompanied by at least one nonionic emulsifier in amounts of preferably from 0.5 to 10% by weight, in particular from 1 to 8% by weight, and with particular preference from 1.5 to 4% by weight, based in each case on the overall monomer amount. Nonionic emulsifiers which can be used are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and polyethylene oxide/polypropylene oxide block copolymers. Preference is given to using ethoxylates of long-chain alkanols (alkyl: $C_{10}$–$C_{22}$, average degree of ethoxylation: from 10 to 50) and, of these, particular preference to those having a linear $C_{12}$–$C_{18}$ alkyl radical and an average degree of ethoxylation of from 10 to 50, as sole nonionic emulsifiers.

Further customary emulsifiers are preferably anionic in nature. They include alkali metal and ammonium salts of alkyl sulfates (alkyl: $C_8$–$C_{16}$), of sulfuric monoesters with ethoxylated alkanols (EO units: 2 to 50, alkyl: $C_{12}$ to $C_{18}$) and with ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$). Further suitable emulsifiers are given in Houben-Weyl, Methoden der organischen Chemie, Volume XIV/1, Makromolekulare Stoffe, Georg-Thieme Verlag, Stuttgart, 1961, pages 192–208.

Preferred anionic surface-active substances are compounds of the formula A,

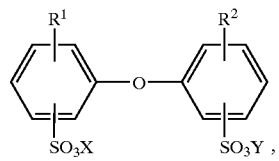

(A)

where $R^1$ and $R^2$ are hydrogen or $C_4$–$C_{24}$ alkyl and are not simultaneously hydrogen, and X and Y are alkali metal ions and/or ammonium ions. In the formula (A), $R^1$ and $R^2$ are preferably linear or branched alkyl radicals having from 6 to 18 carbon atoms or hydrogen, and in particular have 6, 12 or 16 carbon atoms, and $R^1$ and $R^2$ are not both simultaneously hydrogen. X and Y are preferably sodium, potassium or ammonium, with sodium being particularly preferred. Especially advantageous compounds (A) are those in which X and Y are sodium, $R^1$ is a branched alkyl radical having 12 carbon atoms and $R^2$ is hydrogen or the same as $R^1$. Use is frequently made of technical-grade mixtures containing from 50 to 90% by weight of the monoalkylated product, an example being Dowfax® 2A1 (trade name of Dow Chemical Company). The compounds I are common knowledge, from U.S. Pat. No. 4,269,749, for example, and are available commercially.

It is also possible to use suitable protective colloids, such as polyvinyl alcohols, cellulose derivatives or vinylpyrrolidone copolymers, for example. A lengthy description of further suitable protective colloids is given in Houben-Weyl, Methoden der Organischen Chemie, Vol. 14/1, Makromolekulare Stoffe, Georg-Thieme-Verlag, Stuttgart, 1961, pp. 411–420. The overall amount of surface-active substances makes up usually up to 30% by weight, preferably from 0.5 to 10% by weight, and with particular preference from 2 to 6% by weight, based on the monomers to be polymerized.

The molecular weight of the copolymers P used as binders may be adjusted by adding small amounts, generally up to 2% by weight, based on the monomers to be polymerized, of one or more molecular weight regulator substances, examples being organic thio compounds and allyl alcohols. However, preference is given to polymers prepared in the absence of such compounds.

The emulsion polymerization may be conducted as continuously or in batch mode, preferably by a semicontinuous procedure. The monomers to be polymerized may be supplied to the polymerization mixture continuously, including by staged or gradient procedures. Preference is given to a feed process with short feed times; i.e., the monomers, preferably in the form of an aqueous emulsion, are metered in to the reaction mixture over the course of from 1 to 4 hours, preferably over the course of from 1.5 to 3 hours. The nonionic emulsifier is preferably included in amounts of up to 20% by weight, based on the overall amount of nonionic emulsifier, in the initial charge, whereas the anionic emulsifier is preferably supplied to the reaction mixture together with the monomers.

As well as the seed-free mode of preparation, the emulsion polymerization may also be conducted by the seed latex technique or in the presence of a seed latex prepared in situ, in order to set the polymer particle size. Techniques for this purpose are known and may be found in the prior art (see EP-B 40 419 and also 'Encyclopedia of Polymer Science and Technology', Vol. 5, John Wiley & Sons Inc., New York, 1966, p. 847).

Thus the prior art recommends a feed process in which a defined, fine dispersion of seed polymer is included in the initial charge to the polymerization vessel and the monomers are polymerized in the presence of the seed. The seed polymer particles act here as polymerization nuclei and decouple polymer particle formation from polymer particle growth. In the course of the emulsion polymerization, further seed dispersion may be added. As a result, broad size distributions of the polymer particles are achieved, which are often desirable, especially in the case of polymer dispersions with a high solids content (cf. DE-A 42 13 965). Instead of adding a defined seed latex, such a latex may also be generated in situ. This is done, for example, by including a portion of the monomers and of the initiator together with emulsifier in the initial charge and heating them to reaction temperature to produce a relatively finely divided latex. Then, in the same polymerization vessel, the polymerization proper is carried out by the feed process (see also DE-A 42 13 965).

The manner in which the initiator is metered into the emulsion polymerization is not critical. The initiator may either be included in its entirety in the initial charge to the polymerization vessel or else added continuously or in stages, at the rate in which it is consumed, in the course of the emulsion polymerization. The procedure adopted will depend both on the chemical nature of the initiator and on the polymerization temperature, and may be chosen by the skilled worker as desired. Preference is given to continuous or stage metering to the reaction mixture.

For preparing the copolymer P present in the binder I, it is preferred to operate at temperatures between 10° C. and 120° C., more preferably at temperatures of from 50 to 100° C., and with particular preference between 70 and 95° C.

Following the polymerization reaction proper, it is generally necessary substantially to free the aqueous polymer dispersions of the invention from odorous substances, such as residual monomers and other volatile organic components. This may be done by conventional, physical means, by distillative removal (in particular by steam distillation) or by stripping with an inert gas.

The amount of residual monomers may also be reduced chemically, by free-radical postpolymerization, in particular under the action of redox initiator systems, such as are set out, for example, in DE-A 44 35 423, DE-A 44 19 518, and DE-A 44 35 422. Suitable oxidizing agents for the redox-initiated postpolymerization include, in particular, hydrogen peroxide, tert-butyl hydroperoxide, cumin hydroperoxide, and alkali metal peroxodisulfates. Suitable reducing agents are sodium disulfite, sodium hydrogen sulfite, sodium dithionite, sodium hydroxymethanesulfinate, formamidine-sulfic acid, acetone bisulfite (i.e., the adduct of sodium hydrogen sulfite with acetone), ascorbic acid, and reducing sugar compounds, or water-soluble mercaptans, such as mercaptoethanol. Postpolymerization with the redox initiator system is conducted in the temperature range from 10 to 100° C., preferably from 20 to 90° C. The redox partners may be added to the dispersion independently of one another in their entirety, in portions, or continuously over a period of from 10 minutes to 4 hours. To improve the postpolymerization effect of the redox initiator systems, it is also possible to add soluble salts of metals of changing valence, such as iron, copper or vanadium salts, to the dispersion. In many cases, complexing agents are added as well, which keep the metal salts in solution under the reaction conditions.

It is preferable finally to neutralize the polymer dispersion using a low-odor base, preferably using alkali metal or alkaline earth metal hydroxides, alkaline earth metal oxides or nonvolatile amines. The nonvolatile amines include, in particular, ethoxylated diamines, tertiary amines or polyamines, as available commercially, for example, under the name Jeffamine® (Texaco Chemical Co.). The polymer dispersion is preferably not neutralized using ammonia. Examples of amines of this kind include triethanolamine, dimethylethanolamine, and methyldiethanolamine, 2-amino-2-methyl-1-propanol, and also polyethyleneimine and polyvinylamine.

The copolymers P used as binders I generally have minimum film formation temperatures of below 10° C., preferably below 5° C., and with particular preference below 3° C. The average size of the polymer particles present in the binder dispersions, as determined by light scattering, is preferably in the range from 100 to 300 nm, with particular preference in the range from 120 to 200 nm.

The light transmittance (see below) of the dispersions is generally in the range from 40 to 90%, preferably in the range from 50 to 80%, and in particular in the range from 50 to 75%. Over wide ranges, it correlates with the size of the dispersed particles; in other words, the greater the LT (light transmittance 0.01% strength by weight sample) the lower the diameter of the dispersed particles.

The binders I present in the pigmented formulations of the invention are virtually free from solvents, monomers or other volatile components, owing to their mode of preparation, and are therefore low-odor and low-emission formulations.

In addition, the solvent-free pigmented formulations of the invention comprise a pigment II, for which not only organic pigments but also, in particular inorganic pigments are used.

Typical inorganic pigments II for the solvent-free formulations of the invention, especially for emulsion paints, are, for example, titanium dioxide, preferably in the rutile form, barium sulfate, zinc oxide, zinc sulfide, basic lead carbonate, antimony trioxide, and lithopones (zinc sulfide+barium sulfate). However, the formulations may also contain colored pigments, examples being iron oxides, carbon black, graphite, luminescent pigments, zinc yellow, zinc green, ultramarine, manganese black, antimony black, manganese violet, Paris blue or Schweinfurter green. Besides the inorganic pigments, the formulations of the invention may also include organic color pigments, examples being sepia, gamboge, Cassel brown, toluidine red, para red, Hansa yellow, indigo, azo dyes, anthraquinonoids and indigoid dyes, and also dioxazine, quinacridone, phthalocyanine, isoindolinone, and metal complex pigments.

The solvent-free pigmented formulation of the invention further comprises at least one pigment dispersant III having an acid number, determined in accordance with DIN 53402, of less than 600, preferably of less than 450, in particular of less than 300. Suitable pigment dispersants include polyacrylic acids or copolymers of acrylic acid, methacrylic acid, maleic anhydride, itaconic acid, fumaric acid or crotonic acid with comonomers such as (meth)acrylates, styrene, α-olefins, maleic monoesters, and also long-chain vinyl esters of Versatic acids. As pigment dispersants III it is also possible to use polyphosphates, including sodium or potassium polyphosphates. Preferred pigment dispersants III used include polyacrylic acids or copolymers of acrylic acid, styrene and α-methylstyrene, copolymers of acrylic acid with alkyl acrylates such as n-butyl acrylate, copolymers of maleic anhydride with $C_{10}$–$C_{30}$ α-olefins (hydrolyzed) or copolymers of maleic anhydride with styrene (hydrolyzed). Further suitable pigment dispersants include amphiphilic copolymers, prepared by polymer-analogous reaction of polymers rich in acid groups (e.g., polyacrylic acid) with long-chain alcohols, amines or epoxides, or of copolymers containing carboxylic anhydrides (e.g., maleic anhydride and styrene) with alcohols or amines.

Furthermore, the formulation of the invention may also comprise an inorganic filler IV.

Suitable inorganic fillers include in principle aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silica, etc. The fillers may be used as individual components. In practice, however, mixtures of fillers have proven particularly appropriate, e.g., calcium carbonate/kaolin, calcium carbonate/talc. Dispersion plasters may also comprise relatively coarse aggregates, such as sands or sandstone granules. In emulsion paints, naturally, finely divided fillers are preferred.

In order to increase the hiding power and to save on the use of white pigments, use is frequently made in the preferred emulsion paints of finally divided extenders, e.g., finely divided calcium carbonate, or mixtures of different calcium carbonates having different particle sizes. To adjust the hiding power, shade, and depth of color, it is preferred to use blends of color pigments and extenders.

Also present in the solvent-free pigmented formulation of the invention are customary auxiliaries. The designation customary auxiliaries embraces, inter alia, viscosity modifiers, thickeners, dispersants (other than the pigment dispersants mentioned above), defoamers, preservatives, hydrophobicizers, and also dyes, fibers or other components.

Examples of thickeners are cellulose derivatives, such as methylcellulose, hydroxyethylcellulose, and carboxymethylcellulose, and also casein, gum arabic, tragacanth gum, starch, sodium alginate, polyvinyl alcohol, polyvinylpyrrolidone, sodium polyacrylates, water-soluble copolymers based on acrylic and methacrylic acid, such as acrylic acid-acrylamide and methacrylic acid/acrylate copolymers, and what are known as associative thickeners, examples being styrene-maleic anhydride polymers or, preferably, hydrophobically modified polyether urethanes, as described, for example, by N. Chen et al. in J. Coatings Techn. Vol 69, No. 867, 1997, p. 73 and by R. D. Hester et al. in J. Coatings Technology, Vol. 69, No. 864, 1997, 109, the disclosure content of which is hereby incorporated in its entirety by reference.

Examples of hydrophobically modified polyether urethanes are polymers of the formula B Inorganic thickeners as well, such as bentonites or hectorite, may be used. Thickeners are used generally in amounts of from 0.1 to 3%, by weight, preferably from 0.1 to 1% by weight, based on the overall weight of the aqueous formulation. The auxiliaries V further generally include the foamers, preservatives, hydrophobicizers, biocides, fibers or other components.

In order to regulate the film formation properties of the binder copolymers, the formulations of the invention may also include what are known as film formation auxiliaries, examples being ethylene glycol, propylene glycol, butylene glycol, hexylene glycol, alkyl ethers and alkyl ether esters of glycols and polyglycols, e.g., diethylene glycol monoethyl ether, diethylene glycol monoethyl ether acetate, diethylene glycol monobutyl ether, hexylene glycol diacetate, propylene glycol monoethyl, monophenyl, monobutyl and monopropyl ether, dipropylene glycol monomethyl ether, dipropylene glycol mono-n-butyl ether, tripropylene glycol mono-n-butyl ether, and the acetates of the abovementioned monoalkyl ethers, e.g., butoxybutyl acetate; further, alkyl esters of aliphatic monocarboxylic and dicarboxylic acids, e.g., Texanol® from Eastman, or technical-grade mixtures of dibutyl esters of succinic, glutaric and adipic acid. Film formation auxiliaries are normally used in amounts of from 0.1 to 20% by weight, based on the copolymer P present in the formulation, so that the formulation has a minimum film formation temperature of the less than 10° C., preferably in the range from 0 to 10° C. With preference, there is no film formation auxiliary present in the pigmented formulations of the invention.

As customary auxiliaries V it is also possible to use crosslinking additives, including aromatic ketones, e.g., alkyl phenyl ketones, which may carry one or more substituents on the phenyl ring, or benzophenone and substituted benzophenones as photoinitiators. Photoinitiators suitable for this purpose are known, inter alia, from DE-A 38 27 975 and EP-A 417 568. Suitable crosslinking compounds also include water-soluble compounds containing at least two amino groups, examples being dihydrazides of aliphatic dicarboxylic acids according to DE-A 39 01 073, if the copolymer P contains carbonyl-containing monomers in copolymerized form.

Based on nonvolatiles, the solvent-free pigmented formulations of the invention preferably comprises from 4.0 to 30% by weight, in particular from 6 to 20% by weight, of the binder I, (B)

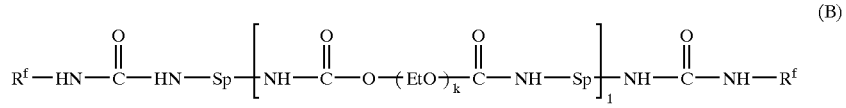

where $R^f$ is a hydrophobic radical, preferably a linear or branched alkyl radical having from 10 to 20 carbon atoms, Et is 1,2-ethylene, Sp is $C_2$–$C_{10}$ alkylene, cycloalkylene or arylene, k is a number in the range from 50 to 1000, and l is a number in the range from 1 to 10, the product k×l preferably being situated within the range from 300 to 1000. The dispersants or wetting agents are generally used in an amount of from 0.1 to 0.6% by weight, based on the overall weight of the emulsion paint.

from 1.0 to 30% by weight, in particular from 3.0 to 15% by weight, of the pigment II, from 0.01 to 1.0% by weight, in particular from 0.03 to 0.3% by weight, of the pigment dispersant III from 40 to 93% by weight of the inorganic filler IV, and from 0.1 to 10% by weight of customary auxiliaries V.

The solvent-free pigmented formulations of the invention may be prepared by a process in which first of all the binder I is prepared by free-radical aqueous emulsion polymerization of the monomers a), b) and c) and, where appropriate, d), which comprises then blending the binder I with the pigment II, the pigment dispersant III, the filler IV, if used, and the auxiliary V in a mixing unit. By a mixing unit is meant in this context, inter alia, a dissolver, i.e., a stirrer having a toothed disk which rotates at high speed.

The free-radical aqueous emulsion polymerization of the monomers a), b) and c) and, where appropriate d) is conducted preferably at temperatures of from 10 to 120° C., in particular at temperatures of from 50 to 95° C., and with particular preference at temperatures of from 70 to 90° C. The blending of the individual components I to V of the formulation of the invention in the dissolver takes place preferably at temperatures of from 3 to 80° C., in particular from 5 to 60° C.

The formulations of the invention are notable, inter alia, for the fact that even at a high pigment volume concentration (PVC) of more than 75% they exhibit very good wet abrasion and have a high wet scrub resistance. The binder present within the formulation of the invention is characterized by a minimum film formation temperature (MFT) of less than 10° C. Because of the very good wet abrasion properties of the pigmented formulations of the invention, it is possible when using them to dispense with the use of polyphosphates, which are otherwise commonly used together with the pigment dispersants.

The formulations of the invention are stable fluid systems which can be used to coat a large number of substrates. Depending on the viscosity and pigment content of the formulation, and on the properties of the substrate, the formulation may be applied, inter alia, by means of rolling, brushing, knife coating, or spraying. The formulations of the invention are suitable, inter alia, as emulsion paints or as colored paper coating slips.

EXAMPLES

A. Analysis

The particle size (z average) of the polymer particles was determined by dynamic light scattering on a 0.01% by weight dispersion at 23° C. using an Autosizer IIc from Malvern Instruments, England. The parameter reported is the cumulant z average of the measured autocorrelation function.

The light transmittance (LT) was determined on a 0.01% by weight dispersion at a path length of 25 mm, using white light, in a commercial photometer. Measurement is carried out relative to water, which is assigned an LT of 100%.

The minimum film formation temperature (MFFT) was determined in accordance with Ullmanns Enzyklopädie der technischen Chemie, 4th Edition, Vol. 19, Verlag Chemie, Weinheim (1980), p. 17. The instrument used was a film former bar (a metal plate to which a temperature gradient is applied). Filming took place at a wet film thickness of 1 mm. The minimum film formation temperature reported is the temperature at which the film begins to develop cracks.

B. Procedure for Preparing the Binders

In a polymerization reactor with a volume of 2 liters, equipped with an anchor stirrer (150 revolutions per minute), a reflux condenser, and two feed vessels, an initial charge was heated to 85° C. under a nitrogen atmosphere. Then 5 g of 2.5% strength sodium persulfate solution were added dropwise and stirring was continued for 5 minutes. Subsequently, feed streams 1 (stirred emulsion feed) and 2 were started and metered in over a period of 2.5 hours. Thereafter, polymerization was continued for 30 minutes. Feed streams 3 and 4 were then metered in, likewise at 85° C., over the course of one hour. The reaction mixture was then cooled to room temperature and neutralized with 10% strength aqueous sodium hydroxide solution. The dispersion obtained was filtered through a sieve with a mesh size of 500 μm. The individual ingredients of the feeds are listed in Table I below.

Notes

The polystyrene seed dispersion used had a particle size, determined using an analytical ultracentrifuge, of 30 nm.

Emulsifier 1=Oxo alcohol ethoxylate (alkyl radical:isotridecyl; average degree of ethoxylation: 8)

Emulsifier 2=Disodium p-dodecyldiphenyl ether disulfonate (Dowfax 2A1)

Emulsifier 3=Sodium lauryl sulfate (Texapon K 12)

TABLE I

|  | Binder 1 (comparative) | Binder 2 (inventive) | Binder 3 (inventive) |
| --- | --- | --- | --- |
| Initial charge: |  |  |  |
| Water | 235 g | 235 g | 235 g |
| Polystyrene seed (33.4% in water) | 12.2 g | 12.2 g | 12.2 g |
| Feed stream 1: |  |  |  |
| Water | 166 g | 126 g | 149 g |
| Emulsifier 1 (20% in water) | 89 g | 89 g | 89 g |
| Emulsifier 2 (20% in water) | 11.4 g | 11.4 g | 11.4 g |
| Emulsifier 3 (10% in water) | 51.1 g | 51.1 g | 51.1 g |
| Acrylamide (50% in water) | 19.5 g | 19.5 g | 19.5 g |
| Acrylic acid | 1.95 g | — | — |
| Itaconic acid (5% in water) | — | 41.5 g | 19.5 g |
| Acid content of the polymer [%] | 0.3 acrylic acid | 0.3 itaconic acid | 0.15 itaconic acid |
| n-Butyl acrylate | 383.5 g | 383.5 g | 383.5 g |
| Styrene | 254.8 g | 254.8 g | 254.8 g |
| Feed stream 2: |  |  |  |
| Sodium persulfate solution (2.5% in water) | 78 g | 78 g | 78 g |
| Feed stream 3: |  |  |  |
| tert-Butyl hydroperoxide (10% in water) | 27 g | 27 g | 27 g |
| Feed stream 4: |  |  |  |
| Ascorbic acid solution (10% in water) | 25 g | 25 g | 25 g |
| Dispersion: |  |  |  |
| Solids content | 49.3% | 49.6% | 49.4% |
| Particle size | 149 nm | 143 nm | 148 nm |
| MFFT | 1° C. | 1° C. | 1° C. |
| LT | 74 | 74 | 70 |

C. Preparation of the Emulsion Paints

The emulsion paints were prepared by using a dissolver to blend the components in the sequence as indicated in the formulas.

Formula 1

| Parts by weight | Component |
|---|---|
| 300 | Water |
| 1 | 20% strength by weight aqueous solution of potassium hydroxide |
| 6 | Thickener, cellulose ether, Natrosol 250 HR from Hercules GmbH, Düsseldorf (DE) |
| 3 | Pigment dispersant S, 45% strength by weight solultion of a sodium polyacrylate from BASF AG, Ludwigshafen (DE) |
| 3 | 50% strength by weight aqueous solution of tetrapostassium pyrophosphate |
| 2 | Preservative, Parmetol A 26 from Schülke & Mayr GmbH, Norderstedt (DE), based on isothiazolinone derivatives and N- and O-formala. |
| 2 | Defoamer, Agitan E 255 from Münzing Chemie GmbH, Helibronn (DE), a polysiloxane copolymer emulsified in water |
| 90 | Pigment, titanium dioxide, Kronos 2300 from Kronos Titan GmbH, Leverkusen (DE) |
| 215 | Filler, calcium carbonate, average particle diameter 2.5 m$\mu$, Omyacarb 5 GU from Omya GmbH, Cologne (DE) |
| 185 | Filler, calcium carbonate, average particle diameter 5 m$\mu$, Omyacarb 5 GU from Omya GmbH, Cologne (DE) |
| 65 | Filler, mixture of magnesium silicate (talc) and calcium/magnesium carbonate (dolomite), average particle diameter 6 m$\mu$, Naintsch SE-Micro from Luzenzac Deutschland GmbH, Düsseldorf (DE) |
| 2 | Defoamer, Agitan E 255 from Münzing Chemie GmbH, Heilbronn (DE), a polysiloxane copolymer emulsified in water |
| 110 | Dispersion (i.e. binder), 50% in water, prepared by procedure in Section B |
| 16 | Water |

Formula 2

| Parts by weight | Component |
|---|---|
| 120 | Water |
| 1 | 20% strength by weight aqueous solution of sodium hydroxide |
| x parts by weight | Dispersant (i.e., pigment dispersant), from Table II |
| 3 | Preservative, Parmetol A 26 from Schülke & Mayr GmbH, Norderstedt (DE), based on isothiazolinone derivatives and N- and O-formala. |
| 4 | Defoamer, Byk 021 from Byk-Chemie GmbH Wesel (DE), based on hydrophobic solids and polysiloxanes in polyglycol. |
| 180 | Thickener solution, 2% of a cellulose ether in water, Natrosol 250 HR from Hercules GmbH, Düsseldorf (DE) |
| 70 | Pigment, titanium dioxide, Kronos 2300 from Kronos Titan GmbH, Leverkusen (DE) |
| 5 | Filler, precipitated silica, Sipernat 820 A from Degussa AG, Düsseldorf (DE) |
| 235 | Filler, calcium carbonate, average particle diameter 5 m$\mu$, Omyacarb 5 GU from Omya GmbH, Cologne (DE) |
| 55 | Filler, calcium carbonate, precipitated, Socal P2 from Solvey Soda Deutschland GmbH, Bernburg (DE) |
| 100 | Filler, calcium carbonate, Omyalite 90 from Omya GmbH, Cologne (DE) |
| 65 | Filler, mixture of magnesium silicate (talc) and calcium/magnesium carbonate (dolomite), average particle diameter 6 m$\mu$, Naintsch SE-Micro from Luzenac Deutschland GmbH, Düsseldorf (DE) |
| 2 | Defoamer, Byk 018 from Byk-Chemie GmbH, Wesel (DE), based on polysiloxanes and hydrophobic solids, in polyglycol. |
| 109 | Dispersion, 50% in water (i.e. binder), prepared by procedure in Section B |
| 51-x parts by weight | Water |

D. Testing of the Emulsion Paints

The emulsion paints obtained from Section C were drawn down using a 60 mm wide coating knife of appropriate width onto Leneta sheet so as to give films with a dry thickness of 100 $\mu$m. These films were stored for 7 days at room temperature and 50% relative humidity. Then, in a scrub tester to DIN 53778, Part 2, a measurement was made of the number of double strokes until the coating had been abraded right through and, respectively, of the abrasion in $\mu$m after 200 double strokes, in accordance with DIN ISO 11998.

Table II below sets out, inter alia, the acid number of the pigment dispersant III used and also the wet abrasion and wet scrub resistance of the resulting emulsion paint, for the inventive Examples 4, 6 and 7 and for the Comparative Examples 1, 2, 3, and 5.

TABLE II

| Ex. No. | Binder No. | Pigment dispersant solids content/cation | Formula No. | Pigment dispersant "x" (parts by weight in formula 2) | Acid number of pigment dispersant | Scrub resistance (wet abrasion) [$\mu$m] | Wet scrub resistance [scrub cycles] |
|---|---|---|---|---|---|---|---|
| 1 | 1 | Pigment dispersant S 45%; Na | 1 | — | 780 | 81 | 1000 |
| 2 | 2 | Pigment dispersant S 45%; Na | 1 | — | 780 | 77 | 900 |
| 3 | 1 | Collacral ® LR 8954 30%; NH$_4$ | 2 | 5 | 195 | 48 | 2500 |
| 4 | 2 | Collacral ® LR 8954 30%; NH$_4$ | 2 | 5 | 195 | 33 | 4,000 |
| 5 | 1 | Densodrin ® BA 25%, Na | 2 | 6.5 | 240 | 38 | 4000 |
| 6 | 3 | Densodrin ® BA 25%, Na | 2 | 6.5 | 240 | 25 | >10000 |
| 7 | 2 | Densodrin ® BA 25%, Na | 2 | 6.5 | 240 | 24 | >10000 |

The acid number of the pigment dispersant is based on the nonneutralized solid. It was determined in accordance with DIN 53 402 or taken from the manufacturer's technical literature (Joncryl, Atofina).

Densodrin BA is a pigment dispersant from BASF AG. It consists of a copolymer of maleic anhydride with a $C_{20}$ alpha-olefin in which the anhydride groups have been opened with NaOH to give the disodium salt. Collacral®LR 8954 is a pigment dispersant from BASF AG in the form of an acrylic acid and n-butyl acrylate copolymer which has been neutralized with ammonia.

Comparison of the binders Nos. 1, 2 and 3 used, shows that with the pigment dispersant having a high acid number (>600) the inventive binder No. 2 displays no advantage over the comparative binder No. 1 (Examples 1 and 2). When the inventive pigment dispersants with a reduced acid number (<600) are used, however, the inventive binders Nos. 2 and 3 are superior to the comparative binder No. 1.

We claim:

1. A solvent-free pigmented formulation comprising
   I) a binder based on at least one copolymer P in an aqueous polymer dispersion obtained by free-radical aqueous emulsion polymerization of a monomer mixture consisting of
      a) from 45 to 69.95% by weight of at least one monomer a) whose homopolymer has a glass transition temperature Tg of less than 20° C.,
      b) from 30 to 54.95% by weight of at least one monomer b) whose homopolymer has a glass transition temperature Tg of more than 50° C.,
      c) from 0.05 to 1.5% by weight of itaconic acid and/or its anhydride and/or its salts, as acidic monomer c), and
      d) selected from the group consisting of at least one of amides of $\alpha,\beta$-unsaturated $C_3$–$C_6$ carboxylic acids, their $C_2$–$C_6$ hydroxyalkyl esters and N-vinyllactams from 0 to 2% by weight of at least one further monomer d), the sum of the % by weight of a) to d) being 100% by weight,
   II) at least one pigment,
   III) at least one pigment dispersant having an acid number according to DIN 53402 of less than 300,
   IV) optionally, an inorganic filler, and
   V) customary auxiliaries.

2. A formulation as claimed in claim 1, wherein the monomer a) is selected from the group consisting of vinyl ethers of $C_3$–$C_{10}$ alkanols, branched and unbranched $C_3$–$C_{10}$ olefins, $C_1$–$C_{10}$ alkyl acrylates, $C_5$–$C_{10}$ alkyl methacrylates, $C_5$–$C_{10}$ cycloalkyl (meth)acrylates, $C_1$–$C_{10}$ dialkyl maleates, and $C_1$–$C_{10}$ dialkyl fumarates.

3. A formulation as claimed in claim 1, wherein the monomer b) is selected from the group consisting of vinylaromatic monomers, $\alpha,\beta$-unsaturated carbonitriles and carbodinitriles.

4. A formulation as claimed in claim 1, where itaconic acid is the sole acidic monomer c).

5. A formulation as claimed in claim 1, wherein said pigment II) is an inorganic pigment.

6. A formulation as claimed in claim 1, comprising an inorganic filler IV selected from the group consisting of aluminosilicates, silicates, alkaline earth metal carbonates, and alkaline earth metal sulfates.

7. A formulation as claimed in claim 1, comprising as customary auxiliaries V) viscosity modifiers, dispersants, defoamers, preservatives, hydrophobicizers, dyes or fibers.

8. A formulation as claimed in claim 1, comprising based on a total formulation
   from 4.0 to 30% by weight of the binder I,
   from 1.0 to 30% by weight of the pigment II,
   from 0.01 to 1.0% by weight of the pigment dispersant III,
   from 40 to 93% by weight of the inorganic filler IV, and
   form 0.1 to 10% by weight of customary auxiliaries.

9. A process for preparing a formulation as claimed in claim 1, in which first the binder I is prepared by free-radical aqueous emulsion polymerization of the monomers a), b) and c) and, optionally d), which comprises then blending the binder "I) with the at least one pigment II), the at least one pigment dispersant III), the filler IV), if used, and the customary auxiliaries V)" in a dissolver.

10. A process as claimed in claim 9, wherein the free-radical aqueous emulsion polymerization of the monomers a), b), c) and,optionally d) takes place at temperatures of from 10 to 120° C.

11. An emulsion paint containing a formulation as claimed in claim 1.

12. A colored paper coating slip containing a formulation as claimed in claim 1.

13. A formulation as claimed in claim 1, wherein the pigment dispersant III has an acid number according to DIN 53402 of 195 to 240.

* * * * *